Patented Dec. 4, 1951

2,577,421

UNITED STATES PATENT OFFICE 2,577,421

METHOD FOR TREATMENT OF CITRUS FRUIT

Herman Joseph Keller, Dunedin, Fla.

No Drawing. Application January 24, 1948,
Serial No. 4,209

17 Claims. (Cl. 99—103)

The invention relates to a method for the treatment of citrus fruit. More particularly, it pertains to a procedure for degreening citrus fruit and includes correlated improvements and discoveries whereby that result may be accomplished.

It is an object of the invention to provide a method in accordance with which citrus fruit may be degreened wholly, or to a desired extent, in a relatively short period of time.

Another object of the invention is to provide a method for degreening citrus fruit which is without deleterious effects such as burning which causes the fruit to turn black and the imparting thereto of an indelectable taste, either or both of which render the fruit commerically of no value.

A further object of the invention is the provision of a method in accordance with which degreening of citrus fruit may be readily, effectively and economically carried out.

A particular object of the invention is to provide a method whereby citrus fruit is treated with a member of the group consisting of ethylene oxide, trichloroethane or ethylene dichloride in relatively low concentration which may effect a degreening without any undesired results, and either per se, or in conjunction with ethylene, or in compatible admixtures.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In the practice of the invention, the degreening of citrus fruit is brought about by treatment of the fruit with an atmosphere containing a member of the group consisting of ethylene oxide, trichloroethane and ethylene dichloride. The concentration of these substances is that which is sufficient to effect a substantial, which may be complete, degreening of the fruit but which is insufficient to affect deleteriously the color and the flavor thereof. It has been found that at higher concentrations, the fruit acquires an unpleasant taste which detracts from its value and even renders it unmarketable.

The treatment of the fruit usually takes place in a coloring room of about three thousand cubic feet. This room will hold about one thousand standard boxes of oranges, and is equipped with a forced draft fan whereby a rapid circulation of air is attained. Further, the temperature within the coloring room is controlled within the range from about 75° F. to about 90° F. and preferably at a temperature at about 85° F. Additionally the humidity within the room may be controlled so that the relative humidity is from about 80% to about 100%, and desirably to about 90% at a temperature of about 85° F. Moreover, the boxes of fruit are so arranged within the room that there is a ready circulation of air around and through them.

Furthermore, it may be mentioned that the air in a coloring room is changed about every fifteen to twenty minutes, and accordingly only a small amount of the treating compound is required or present in the room at a given moment. It has been found that the treatment whereby degreening of the fruit is accomplished may be for a period from about eighteen hours to about forty hours, depending upon the amount of color to be removed, and usually subjection to an atmosphere containing the above mentioned compounds for a period of about twenty-four hours suffices to bring about a removal of the green color to a desired extent.

The above mentioned compounds either alone or in compatible admixture may be vaporized by one or a combination of the following procedures. The compounds may be fed through a suitable metering apparatus on to an electric or steamheated plate placed in the coloring room whereby the compound volatilizes substantially immediately. Additionally, the compounds may be atomized or vaporized by means of a jet of steam which is conducted into the coloring room. Further, in the case of liquids of relatively high volatility, the required, or measured, amount may be vaporized by passage of air through the liquid. Moreover, the compounds may be placed in desired amount in a receptacle of suitable size which is installed close to the ceiling of the room and over which air from a fan passes. It will be understood that the foregoing procedures are illustrative, and that the compounds may be introduced into the coloring room in any manner which serves to bring about an effective and uniform distribution and concentration thereof.

Further, by way of exemplification, and without limitation to the particular compounds, amounts and times mentioned, satisfactory results may be obtained through introduction of the degreening agent into a coloring room having an area, or space, of about three thousand cubic feet in an amount such that at all times, the concentration thereof will be from about 0.25 pound to about 1.25 pounds per thousand cubic feet of space. The actual amount utilized will vary since there may be a rather large gas leakage from the room even though every effort is made to avoid such leakage, and inasmuch as there may be a rapid change of air in the room. Thus — more particularly — the amount introduced will be sufficient to maintain the concentration within the foregoing range, and this as an average may be about thirty pounds per day for a room of three thousand cubic feet. The concentration suitably per thousand cubic feet of space, may be from about 0.3 to about 0.75 pound of ethylene dichloride, and of trichloroethane, and from about 0.5 pound to about 1.0 pound of ethylene oxide at a temperature of about 85° F. and a relative humidity of about 90%.

As above indicated, a member of the specified group of compounds may be utilized in conjunction with ethylene. Their use with ethylene may be in the following proportion, from about 25% to about 50%. The compounds per se occasion effective degreening of the fruit but when employed in conjunction with ethylene, a relatively more thorough degreening takes place in a shorter period of time.

It has been observed also that the use of ethylene dichloride, trichloroethane or ethylene oxide brings about a degreening of citrus fruit in a relatively short period of time which is about one-half to two-thirds of that which has previously been necessary.

When citrus fruit is degreened in accordance with the foregoing procedure, there is a marked reduction in and little likelihood of mold and decay of the fruit because of the short period required for the treatment. The method is also attended by an absence of any burning of the surface of the fruit which destroys the outer peel cells and leads to fruit decay, and there is also not any imparting of a distinct and undesirable flavor to the fruit which would make it unmarketable. Further, a grower may degreen his fruit with a minimum amount of decay, and place it on the market while in a still firm condition at an earlier date. More especially at the beginning of a season that may be of considerable economic importance. A particular advantage of the procedure resides in the fact that the capacity of a fruit packing house is limited by the number and size of its coloring rooms and accordingly if only one half of the previously required time is required for degreening the capacity is doubled.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method for degreening citrus fruit which comprises treating citrus fruit with an atmosphere containing a member of the group consisting of ethylene oxide, trichloroethane and ethylene dichloride, at a temperature from about 75° to about 90° F. and a relative humidity from about 80% to about 100%, the concentration thereof being sufficient to effect substantial degreening of the fruit but insufficient to affect deleteriously the color and the flavor thereof.

2. A method for degreening citrus fruit which comprises treating citrus fruit with an atmosphere containing a member of the group consisting of ethylene oxide, trichloroethane and ethylene dichloride, at a temperature from about 75° to about 90° F. and a relative humidity from about 80% to about 100%, the concentration thereof being sufficient to effect substantial degreening of the fruit but insufficient to affect deleteriously the color and the flavor thereof, and for a period from about eighteen to about forty hours.

3. A method for degreening citrus fruit which comprises treating citrus fruit with an atmosphere containing a member of the group consisting of ethylene oxide, trichloroethane and ethylene dichloride, at a temperature from about 75° to about 90° F. and a relative humidity from about 80% to about 100%, the concentration thereof being sufficient to effect substantial degreening of the fruit and up to about 1.25 pounds per thousand cubic feet of space.

4. A method for degreening citrus fruit which comprises treating citrus fruit with an atmosphere containing a member of the group consisting of ethylene oxide, trichloroethane and ethylene dichloride, the concentration thereof being sufficient to effect substantial degreening of the fruit and up to about 1.25 pounds per thousand cubic feet of space and for a period from about eighteen to about forty hours.

5. A method for degreening citrus fruit which comprises treating citrus fruit in a confined space with an atmosphere containing a member of the group consisting of ethylene oxide, trichloroethane and ethylene dichloride, at a temperature from about 75° to about 90° F. and a relative humidity from about 80% to about 100%, the concentration thereof being sufficient to effect substantial degreening of the fruit but insufficient to affect deleteriously the color and the flavor thereof.

6. A method for degreening citrus fruit which comprises treating citrus fruit in a confined space with an atmosphere containing a member of the group consisting of ethylene oxide, trichloroethane and ethylene dichloride, at a temperature from about 75° to about 90° F. and a relative humidity from about 80% to 100%, the concentration thereof being sufficient to effect substantial degreening of the fruit and up to about 1.25 pounds per thousand cubic feet of space and for a period from about eighteen to about forty hours.

7. A method for degreening citrus fruit which comprises treating citrus fruit with an atmosphere containing a member of the group consisting of ethylene oxide, trichloroethane and ethylene dichloride, at a temperature from about 75° to about 90° F. and a relative humidity from about 80% to about 100%, the concentration thereof being sufficient to effect substantial degreening of the fruit and up to about 1.25 pounds per thousand cubic feet of space and for a period of about twenty-four hours.

8. A method for degreening citrus fruit which comprises treating citrus fruit with an atmosphere containing ethylene and a member of the group consisting of ethylene oxide, trichloroethane and ethylene dichloride, at a temperature from about 75° to about 90° F. and a relative humidity from about 80% to about 100%, the concentration thereof being sufficient to effect substantial degreening of the fruit but insufficient to affect deleteriously the color and the flavor thereof.

9. A method for degreening citrus fruit which comprises treating citrus fruit with an atmosphere containing ethylene and a member of the group consisting of ethylene oxide, trichloroethane and ethylene dichloride, at a temperature from about 75° to about 90° F. and a relative humidity from about 80% to about 100%, the concentration thereof being sufficient to effect substantial degreening of the fruit and up to about 1.25 pounds per thousand cubic feet of space, and for a period from about eighteen to about forty hours.

10. A method for degreening citrus fruit, which comprises treating citrus fruit with an atmosphere containing a member of the group consisting of ethylene oxide, trichloroethane, and ethylene dichloride, at a temperature of about 85° F. and a relative humidity of about 90%, the concentration thereof being sufficient to effect substantial degreening of the fruit but insufficient to affect deleteriously the color and the flavor thereof.

11. A method for degreening citrus fruit which comprises treating citrus fruit with an atmosphere containing a member of the group consisting of ethylene oxide, trichloroethane, and ethylene dichloride at a temperature from about 75° to about 90° F. and a relative humidity from about 80% to about 100%, the concentration thereof being sufficient to effect substantial degreening of the fruit and up to about 1.25 pounds per thousand cubic feet of space and for a period from about eighteen to about forty hours.

12. A method for the degreening of citrus fruit which comprises treating citrus fruit with an atmosphere containing a member of the group consisting of ethylene oxide, trichloroethane and ethylene dichloride, at a temperature of about 85° F. and a relative humidity of about 90%, the concentration thereof being from about 0.25 pound to about 1.25 pounds per thousand cubic feet of space and for a period from about eighteen to forty hours.

13. A method for degreening citrus fruit which comprises treating citrus fruit with an atmosphere containing a member of the group consisting of ethylene oxide, trichloroethane and ethylene dichloride, at a temperature of about 85° F. and a relative humidity of about 90%, the concentration thereof being from about 0.25 pound to about 1.25 pounds per thousand cubic feet of space and for a period of about 24 hours.

14. A method for degreening citrus fruit which comprises treating citrus fruit with an atmosphere containing a member of the group consisting of ethylene oxide, trichloroethane and ethylene dichloride in a concentration sufficient to effect desired degreening of the fruit but insufficient to affect deleteriously the color and the flavor thereof.

15. A method of degreening citrus fruit which comprises treating citrus fruit with an atmosphere containing an admixture of trichloroethane and ethylene dichloride in a concentration sufficient to effect desired degreening of the fruit but insufficient to affect deleteriously the color and the flavor thereof.

16. A method of degreening citrus fruit which comprises treating citrus fruit with an atmosphere containing an admixture of trichloroethane and ethylene dichloride at a temperature from about 75° to about 90° F., and at a relative humidity of from about 80% to about 100%, the concentration thereof being sufficient to effect substantial degreening of the fruit but insufficient to affect deleteriously the color and flavor thereof.

17. A method of degreening citrus fruit which comprises treating citrus fruit with an atmosphere containing an admixture of trichloroethane and ethylene dichloride at a temperature from about 75° to about 90° F., and at a relative humidity of from about 80% to about 100%, the concentration thereof being sufficient to effect substantial degreening of the fruit but insufficient to affect deleteriously the color and flavor thereof, and for a period from about eighteen to about forty hours.

HERMAN JOSEPH KELLER.

REFERENCES CITED

The following references are of record in the file of this patent:

UNITED STATES PATENTS

| Number | Name | Date |
| --- | --- | --- |
| 1,846,143 | Rice | Feb. 23, 1932 |
| 1,875,473 | McKee | Sept. 6, 1932 |
| 2,042,938 | Hentrich et al. | June 2, 1936 |
| 2,075,845 | Gross et al. | Apr. 6, 1937 |
| 2,107,697 | Griffith et al. | Feb. 8, 1938 |

OTHER REFERENCES

"The Chemistry of Petroleum Derivatives," by Carleton Ellis, vol. 11, pages 844, 845, 847, 848, Reinhold Publishing Corp., N. Y., publishers, 1937 edition.